C. HIPPENSTEEL.
Corn Planter.
No. 102,004.        Patented April 19, 1870.
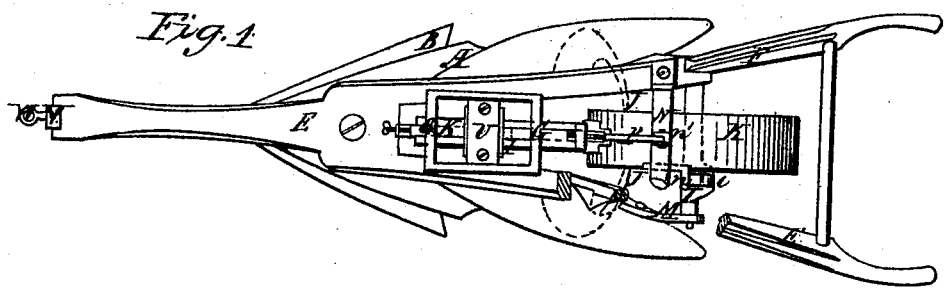
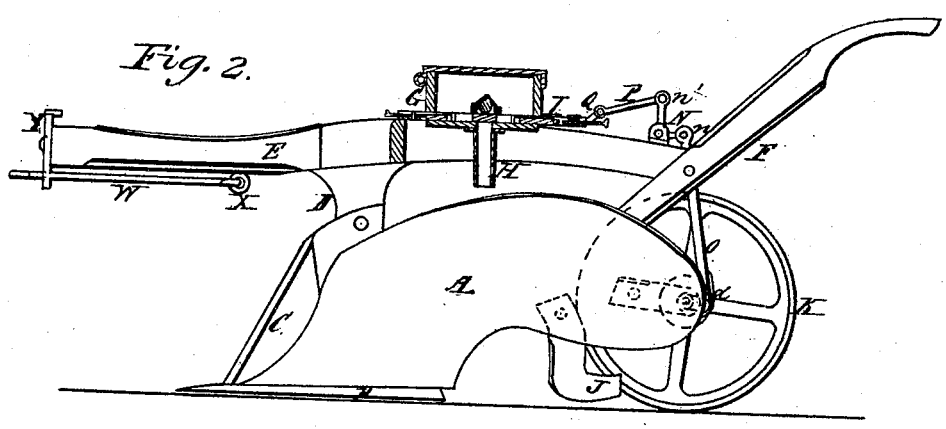
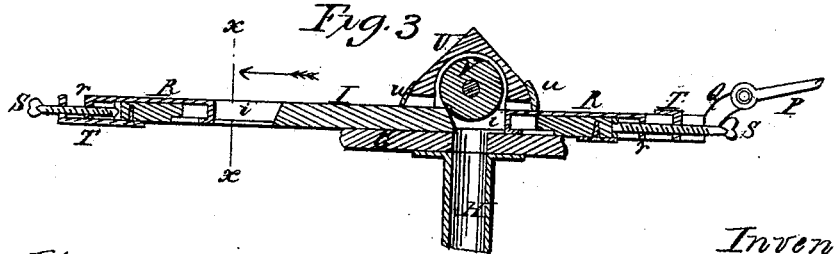 
Witnesses
William B. Deming
John Grinnell
Inventor
C. Hippensteel
by Knight Bros
Attorney

United States Patent Office.

CHRISTOPHER HIPPENSTEEL, OF LEE'S CROSS ROADS, PENNSYLVANIA.

Letters Patent No. 102,004, dated April 19, 1870.

IMPROVEMENT IN CORN-PLANTER.

The Schedule referred to in these Letters Patent and making part of the same.

*To all whom it may concern:*

Be it known that I, CHRISTOPHER HIPPENSTEEL, of Lee's Cross Roads, in the county of Cumberland and State of Pennsylvania, have invented certain new and useful Improvements in Corn-Planters; and I do hereby declare the following to be a sufficiently full, clear, and exact description to enable one skilled in the art to which my invention appertains to carry it into effect, reference being had to the accompanying drawings which form part of this specification.

My invention relates primarily to that class of corn-planters adapted for planting in previously unplowed ground, and consisting essentially of a double mold-board plow for opening the furrow, a seed-box and dropping-device arranged between the mold-boards of said plow, a suitable covering-device, and a roller.

My improvements consist—

First, in a novel combination and arrangement of the parts named above, and suitable accessories to render the machine compact and easily handled, and to adapt the planting operation to be automatically performed.

Second, in the combination, with the usual cut-off in the seed-box, of an elastic roller arranged over the discharge-spout, and operating by pressing into the perforations in the dropping-slide as they pass under it to secure the discharge of the seed.

In the drawings—

Figure 1 represents a plan view, with certain portions broken away and omitted, to expose parts below, of a corn-planter embodying my improvements.

Figure 2, a side elevation of the same, with the seed-box and slide in vertical section, and a fragment of frame removed to expose the same.

Figure 3 represents a longitudinal section on an enlarged scale of the dropping-slide and its accessories.

Figure 4, a transverse section of the dropping slide on the line *x x*, fig. 3.

Similar marks of reference indicate like parts in the several figures.

A A represent the double mold-board;

B, the share and point;

C, the colter;

D, the standard or neck;

E, the beam, and

F F, the handles of a double mold-board plow, all of which parts may be constructed, except in particulars hereinafter specified, and united in the usual or any suitable manner.

G represents the seed-box, which, of suitable form, is arranged immediately behind that point where the beam E forks for attachment to the handles F F, as shown, or over a corresponding aperture therein; its discharge-spout H extending down through said beam to a point more or less near the surface of the furrow.

I represents the dropping-slide.

J J represent the coverers, which, as shown, are applied to the lower edge of the mold-boards A A, and consist of curved wings or scrapers of suitable shape projecting inwardly and downwardly therefrom.

K represents the roller, which is also arranged between the mold-boards A A, its shaft L being mounted in brackets M M attached to the inner sides thereof. It is of suitable form and width to adapt it to press the earth down over the seed properly, and is arranged immediately behind the coverers J J.

*l* represents a crank formed in the shaft L.

N represents a rock-shaft mounted in suitable bearings on the top of the beam E, and having one arm, *n*, connected by a pitman, O, with the crank *l*, and another arm, *n'*, at about right angles to *n*, connected by a pitman or link, P, and clip Q, to the dropping-slide I, which thus receives its motion.

*i i*, figs. 3 and 4, represent the seed-cells or perforations of the dropping-slide I, which are so elongated as to contain the maximum number of grains for a hill.

R R represent supplementary slides for regulating the area of the perforations *i i*, as required.

These slides are made of any suitable form and material, and secured in place in any suitable manner; being preferably made of sheet-metal, as shown, working in depressions in the top of the main slide, and having their inner ends turned down through the perforations *i* and secured by lateral enlargement on the under side, where depressions are also provided for them, as shown in fig. 4.

*r r* represent nuts or lips provided with screw threaded perforations on the outer ends of the slides R R.

S S represent screws attached by swiveled joints to the ends of the main slide I, provided preferably with thumb-heads, and working in the nuts *r r* to adjust the regulating-slides R R.

T T represent brackets attached to the slide I for the support of the outer ends of the screws S S.

For the convenience of adjustment of the slides R, both ends of the dropping-slide I are preferably adapted to be always external to the seed-box, as represented in figs. 1 and 2.

U represents the shield for covering the discharge-aperture in the seed-box, and

*u u*, the customary cut-offs (consisting of brushes strips of rubber, or their equivalent,) provided on said shield to sweep back surplus grains from the cells of of the dropping-slide.

V represents a soft elastic roller of rubber or other suitable substance inclosed within the shield U over the discharge-aperture of the seed-box, and so arranged as to be compressed by the dropping slide when its solid portions are passing under it, operating by pressing into the seed-cells or perforations $e$ as they are brought under it to eject the seed.

W, figs 1 and 2, represents the draft-rod.

X, the staple for attaching it to the beam E, and which is arranged some distance back from the front end of said beam, as shown in fig. 2, and Y, a vertically-adjustable clip or bracket for supporting its front end, and, by depressing or elevating this, regulating the depth of the working of the machine.

In operation, the draft-rod W having been adjusted to the desired depth, and the perforations $e$ of the dropping-slide I adjusted to the desired number of grains, the team is attached, the box G filled with corn, and the plow being run into the ground, the planting commences.

The double mold-board A A opens the furrow, turning under away from "the row" the grass and weeds. The seed is dropped in this furrow through the spout H by the reciprocation of the dropping slide I in hills, regulated as to number of grains by the adjustment of the regulating-slides R, and as to distance apart by the circumference of the roller K twice in each revolution of which the planting is performed.

The furrow is filled behind the dropper from the rich clean earth in the bottom of the furrow by the coverers J J.

The roller K then presses down the earth over the seed, when the operation is completed.

The machine is simple, strong, and durable in its construction, neat and compact in its appearance, adapted to be managed with ease and facility, and to be readily adjusted as desired, and performing the work in a very superior manner and with the greatest possible regularity and precision.

Having thus described my invention,

The following is what I claim and desire to secure by Letters Patent:

1. The combination and arrangement of the double mold-board A A, seed-box G H, coverers J J, roller K, and mechanism $l$, O, N, P, Q, for operating the seed-dropping slide from the shaft of the roller, substantially as and for the purposes set forth.

2. The combination with the shield U and cut-offs $u$ $u$, of the elastic roller V, arranged to operate as herein described, for the purposes set forth.

To the above specification of my invention I have hereunto set my hand this 31st day of May, 1869.

C. HIPPENSTEEL.

Witnesses:
P. D. HENDRICKS,
HENRY McDANNEL.